United States Patent [19]

Furuhashi et al.

[11] Patent Number: 5,646,644
[45] Date of Patent: Jul. 8, 1997

[54] LIQUID CRYSTAL DISPLAY DEVICE

[75] Inventors: Tsutomu Furuhashi; Hiroyuki Mano; Terumi Takashi, all of Yokohama; Kiyokazu Nishioka, Odawara; Toshio Futami, Nobara, all of Japan

[73] Assignee: Hitachi, Ltd., Tokyo, Japan

[21] Appl. No.: 646,843

[22] Filed: May 8, 1996

Related U.S. Application Data

[63] Continuation of Ser. No. 299,671, Sep. 2, 1994, Pat. No. 5,552,801, which is a continuation of Ser. No. 966,563, Oct. 26, 1992, abandoned, which is a continuation of Ser. No. 556,364, Jul. 24, 1990, abandoned.

[30] Foreign Application Priority Data

Jul. 28, 1989 [JP] Japan .................................. 1-194094

[51] Int. Cl.$^6$ .................................................. G09G 3/36
[52] U.S. Cl. .................................. 345/100; 345/87; 345/88
[58] Field of Search .............................. 345/87, 88, 92, 345/98, 100

[56] References Cited

U.S. PATENT DOCUMENTS

| | | | |
|---|---|---|---|
| 4,646,074 | 2/1987 | Hashimoto | 345/206 |
| 4,724,433 | 2/1988 | Inoue et al. | 345/87 |
| 4,745,485 | 5/1988 | Iwasaki | 345/88 |
| 4,775,891 | 10/1988 | Aoki et al. | 345/87 |
| 4,870,399 | 9/1989 | Carlson | 345/100 |
| 4,985,698 | 1/1991 | Mano et al. | 345/88 |
| 5,017,914 | 5/1991 | Uchida et al. | 345/98 |

FOREIGN PATENT DOCUMENTS

| | | |
|---|---|---|
| 62-203131 | 3/1986 | Japan . |
| 63-181589 | 7/1988 | Japan . |
| 01213695 | 8/1989 | Japan . |

Primary Examiner—Mark R. Powell
Assistant Examiner—Matthew Luu
Attorney, Agent, or Firm—Antonelli, Terry, Stout & Kraus, LLP

[57] ABSTRACT

A liquid crystal display device providing a multi tone control function is disclosed, permitting a multi-colored display to be provided by using an analogue display data input, while regulating stepwise the brightness by varying the level of the applied voltage. The liquid crystal display device is composed of serial/parallel converter having a high sampling speed, into which liquid crystal display data are inputted, with a function of converting serial image data into parallel image data, and an X axis direction driver having a low sampling speed, into which the liquid crystal display data for one pixel are inputted, with a function of outputting the liquid crystal display data of one line in the horizontal direction, synchronized with a display line signal for a Y axis direction driver. The S/P converter and the X axis direction driver are disposed separately. Further the S/P converter and the X axis direction driver are constructed so as to hold analogue quantities in order to output the liquid crystal display data applied to the liquid crystal driving elements constituting the pixels of a liquid crystal display panel in the form of analogue signals. In this way a multi-colored display of not less than nine colors, using an analogue input, can be effected, and it is possible to display arbitrarily levels of brightness by varying the level of the applied voltage.

6 Claims, 10 Drawing Sheets

LIQUID CRYSTAL DISPLAY DEVICE

This application is a Continuation of application Ser. No. 08/299,671, filed Sep. 2, 1994, U.S. Pat. No. 5,562,801, which was a Continuation of application Ser. No. 07/966,563 filed Oct. 26, 1992, now abandoned, which was a Continuation of application Ser. No. 07/556,364 filed Jul. 24, 1990, now abandoned.

BACKGROUND OF THE INVENTION

The present invention relates to a liquid crystal display device providing a multi tone control function capable of regulating stepwise the display brightness, in accordance with the voltage applied thereto, and in particular to a method of driving a liquid crystal display device capable of providing a multi-colored display of at least 9 colors with analogue display data input.

A prior art liquid crystal display device used a liquid crystal controller such as HD63645F fabricated by HITACHI, etc.; gave liquid crystal display means such as HD61104 fabricated by HITACHI, etc. image data read out from a display memory storing such image data, which are to be displayed; and displayed the image by taking-in the given image data for every line in the horizontal direction of the image in the liquid crystal display device to output them to a liquid crystal panel. However, such a prior art liquid crystal display device dealt with input data as digital signals; expressed display-on and display-off by 1 and 0; related to a black and white display or a colored display of up to 8 colors; and didn't take any multi-colored display with at least 9 colors into account.

As a prior art liquid crystal display device there is known a "color liquid crystal display device" disclosed in JP-A-Sho62-203131.

This utilizes an S/P converting circuit and a P/S converting circuit in order to arrange display data at writing and reading the data in and from a memory circuit.

Further it utilizes an S/P converting circuit in order to make the bit width uniform in an input interface to an X electrode driving circuit. This doesn't deal with display data represented in an analogue manner.

Furthermore a "video signal transforming circuit" disclosed in JP-A-Sho63-181589 treats the display data through a memory circuit, and no driving method for displaying the display data after treatment in a liquid crystal panel is disclosed.

The prior art liquid crystal display device will be explained in a general way, referring to FIGS. 1 to 4.

Figure 1:
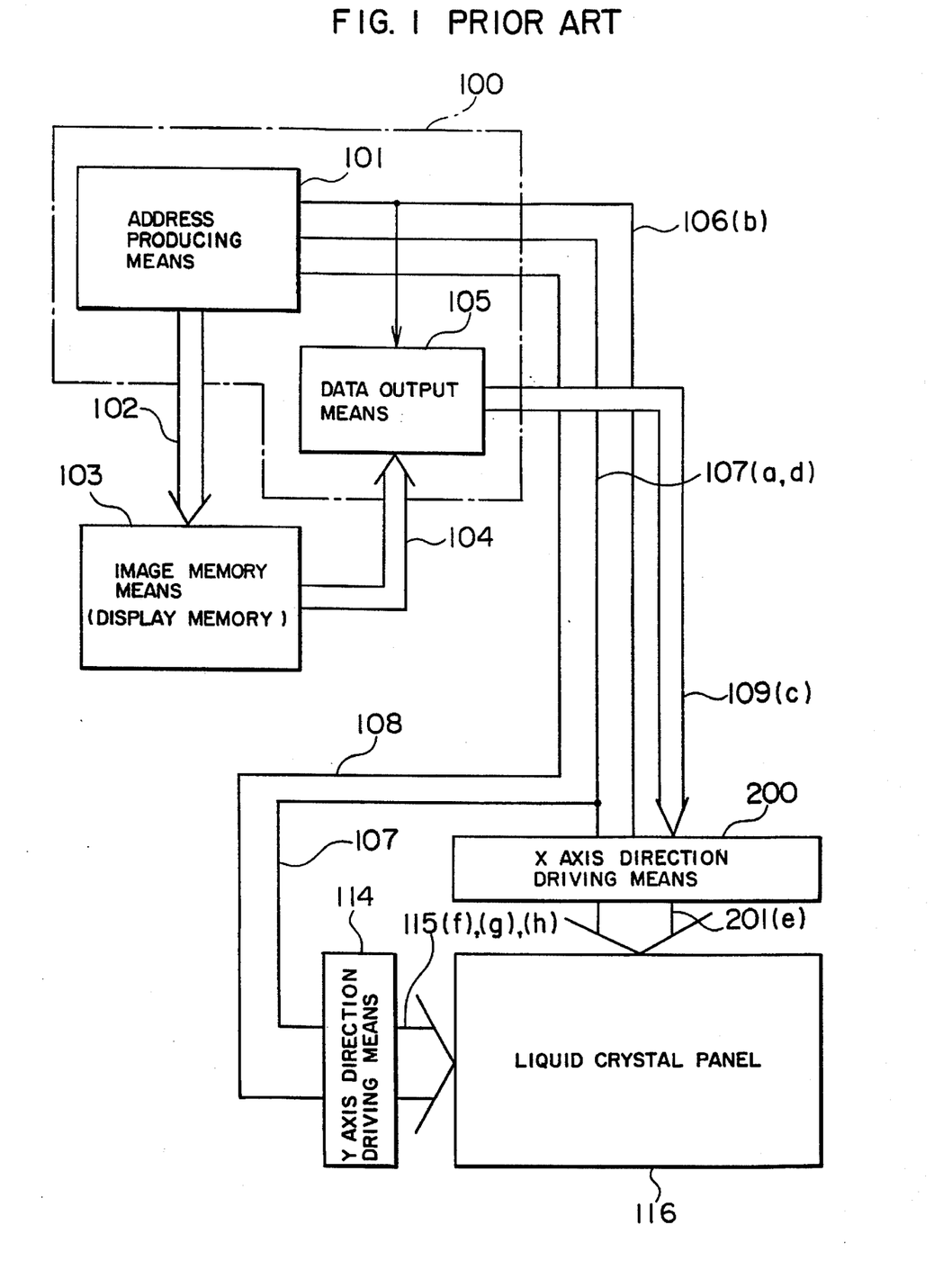
FIG. 1 is a block diagram of a prior art liquid crystal display device.

FIG. 1 is a block diagram showing the prior art liquid crystal display device, in which reference numeral 100 is a liquid crystal controller; 101 is address producing means; 102 is a memory address output; and 103 is image storing means storing data to be displayed (hereinbelow called display memory). 104 represents a display data output from the display memory 103 as a result of the memory address 102, which display data have a data width of 8 bits. 105 is data output means; 107 is a horizontal clock signal; and 108 is a line start clock signal, all of them being produced by the address producing means 101. 109 represents the liquid crystal display data having a 4-bit width synchronized with the data shift clock signal 106. 200 is X (axis direction) driving means; 201 is line liquid crystal display data signal; 114 is Y (axis direction) driving means; 115 is display line data signal; and 116 is a liquid crystal panel, which is driven by the X driving means 200 and the Y driving means 114 to display the display data in a liquid crystal display.

Figure 2:
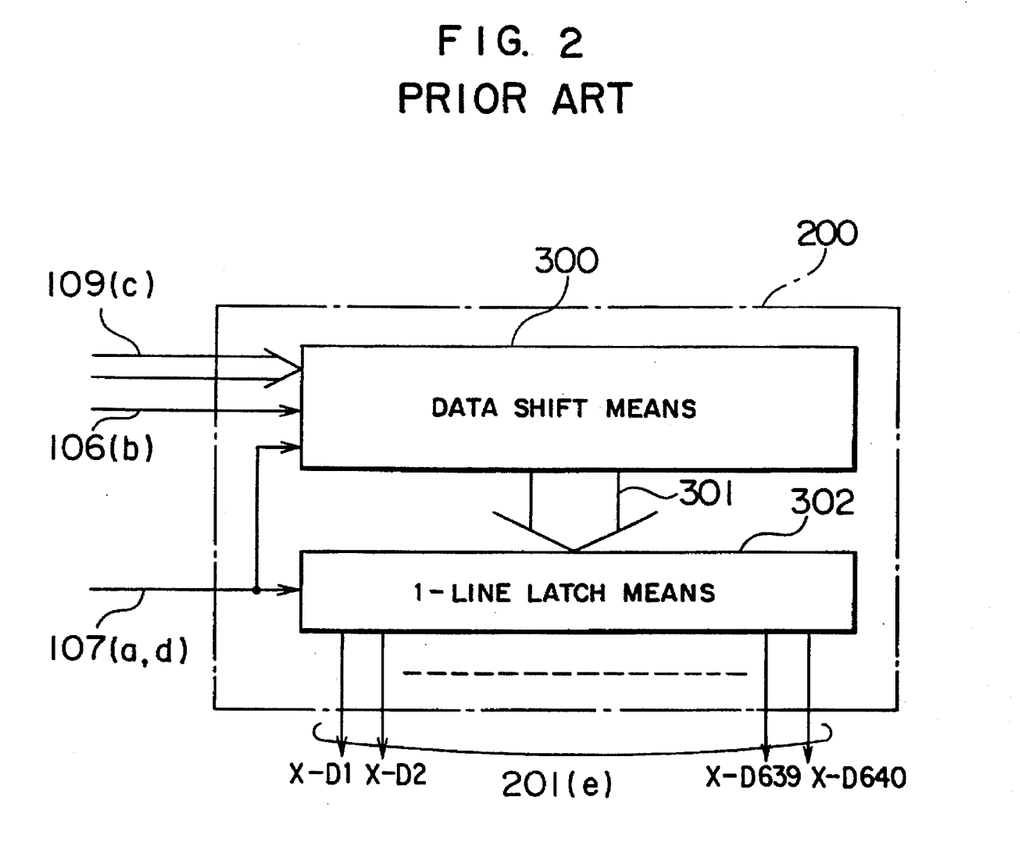
FIG. 2 is a detailed block diagram of the X axis direction driving means indicated in FIG. 1.

FIG. 2 is a block diagram showing in detail the construction of the X driving means 200 in the prior art liquid crystal display device indicated in FIG. 1.

In FIG. 2, 300 is data shift means taking-in the liquid crystal display data 109 for one line by using the shift clock signal 106; 301 represents shift data, which are an output of the data shift means; and 302 is one-line latch means latching the shift data 301 by using the horizontal clock signal 107. X-D1 to X-D640 represent one-line liquid crystal data 201, when 1 line is dotted in 640 on a liquid crystal display screen.

Figure 3:
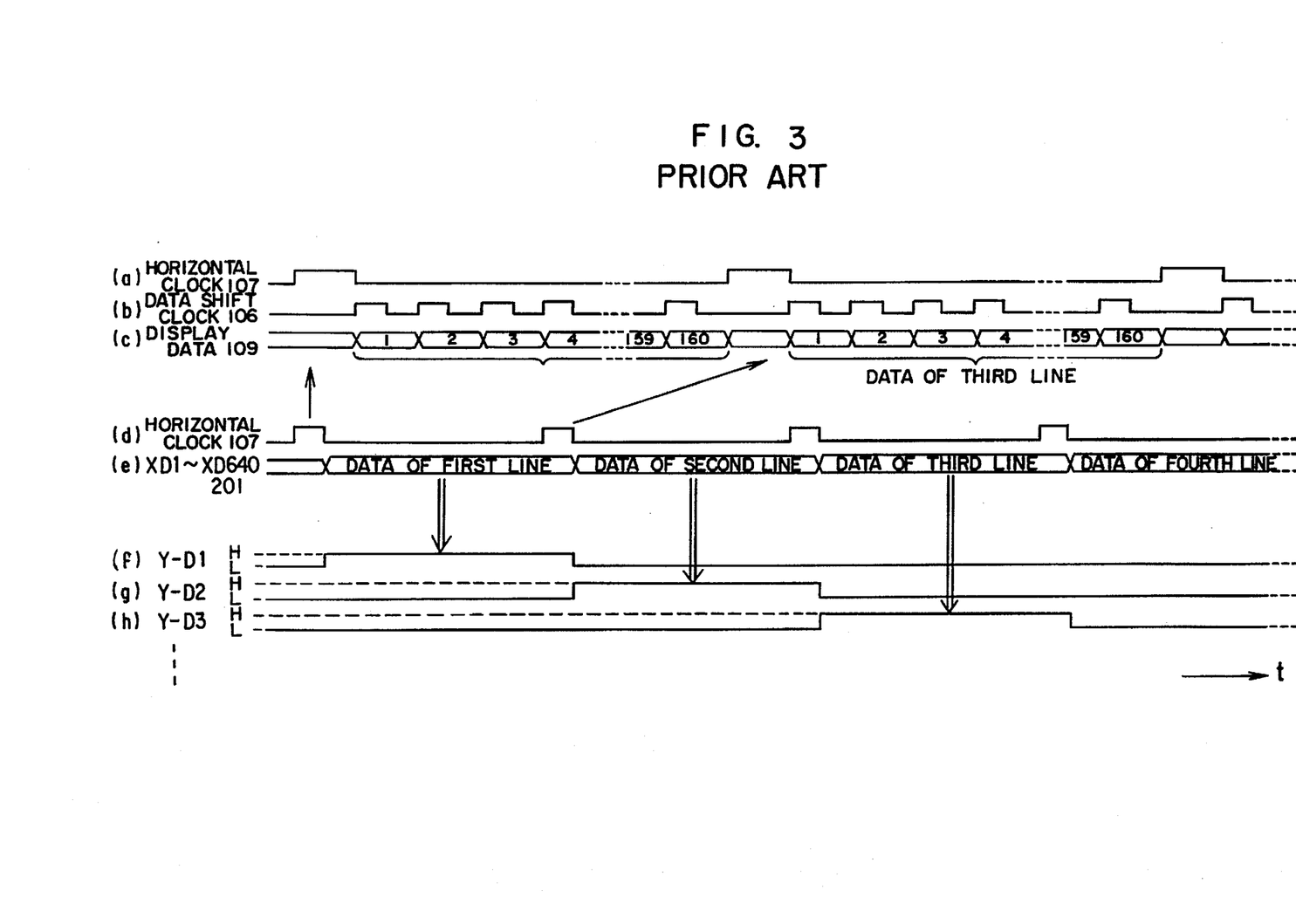
FIG. 3 is an operation timing chart of the X axis direction driving means and the Y axis direction driving means indicated in FIG. 1.

FIG. 3 is a timing chart relating to the operation, when the X driving means 200 and the Y driving means 114 drive the liquid crystal panel 116 in FIG. 1.

In FIG. 3, (a) indicates the horizontal clock 107, which is a clock signal generated for every horizontal scanning priod on the display screen, in sychronism therewith, (b) indicates the data shift clock signal 106, which is a clock having a repetition frequency significantly higher than the horizontal clock 107 and which is used for shifting the liquid crystal display data 109 taken in the data shift means 300 indicated in FIG. 2 within the data shift means 300. (c) is a timing chart indicating the liquid crystal display data 109. After the liquid crystal display data 109 have been formed, there are indicated 160 sets of display data from 1 to 160 (160×4 bits=640 dots), each of which is synchronized with the data shift clock signal 106.

(d) indicates the same horizontal clock 107 as (a), but the time scale is smaller than in (a). (e) shows that the data sets of the 1st line, the 2nd line, the 3rd line, etc. in the 1-line liquid crystal display data X-D1 to x-D640 are synchronized with the horizontal clock 107. (f), (g) and (h) show display line data 115 outputted by the Y driving means 114. That is, (f) indicates the display line data Y-D1 indicating to display the 1st line; (g) indicates the display line data Y-D2 indicating to display the 2nd line; and (h) indicates the display line data Y-D3 indicating to display the 3rd line.

Figure 4:
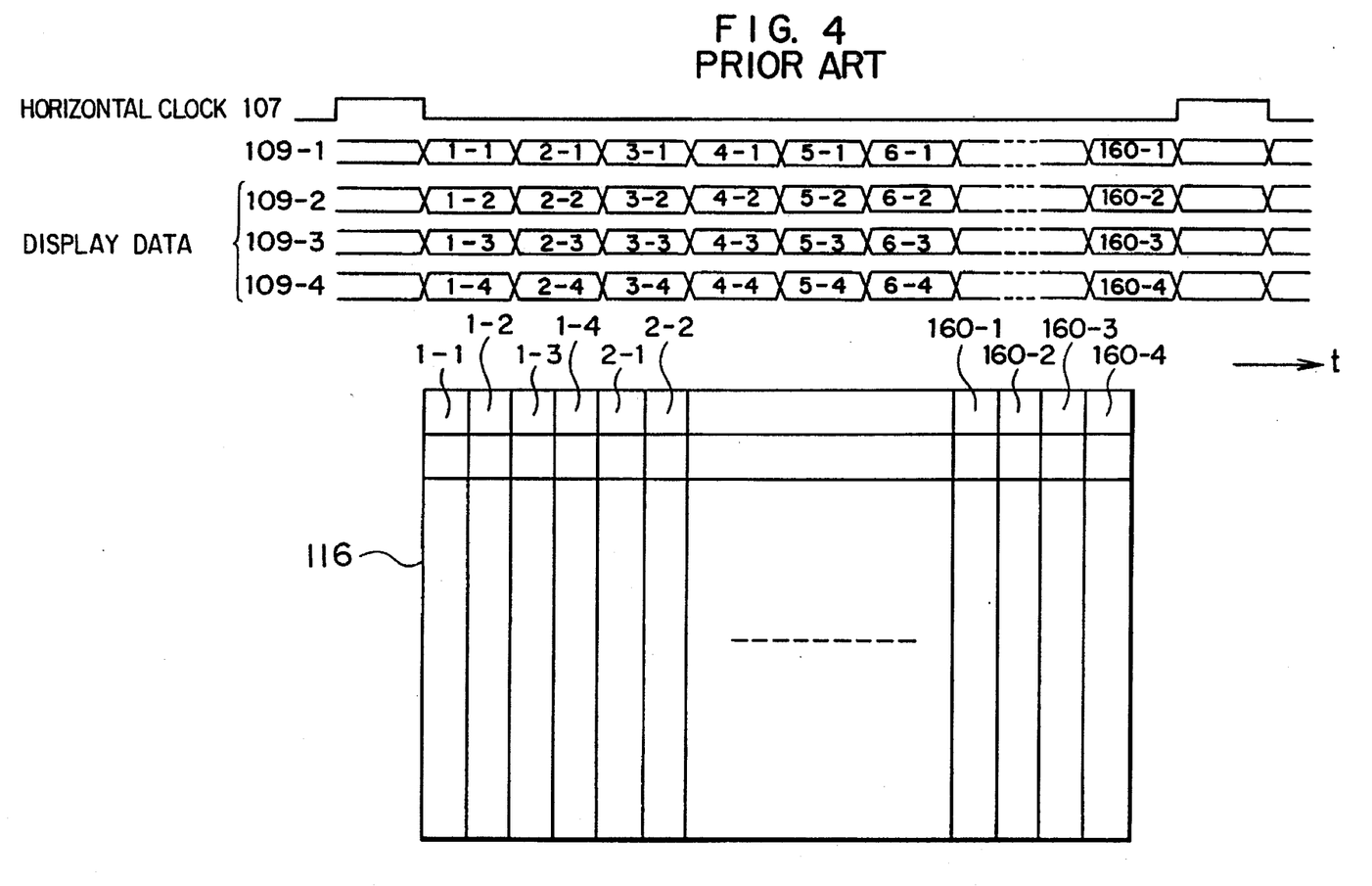
FIG. 4 is a scheme indicating the relation between the display data in FIG. 3 and the displaying of pixels on the liquid crystal panel.

FIG. 4 illustrates the relation between the 4-bit parallel display data 109 in FIG. 3 and the position of display pixels on the liquid crystal panel 116.

In FIG. 4, the liquid crystal display data 109 are 160 sets (160×4 bits=640 bits) of display data from 1 to 160, which correspond to pixels in units of 4 bits from the left end of the screen of the liquid crystal panel 116.

Hereinbelow, in order to explain the operation thereof, FIG. 1 is referred to again.

In FIG. 1, image information, which have been stored in the display memory 103, are read out according to the memory address 102 produced by the address producing means 101 and are transformed into the memory display data 104 having a 8-bit width. These memory display data 104 are inputted to the data output means 105 and converted into data having a 4-bit width in accordance with the interface on the liquid crystal panel side. The converted 4-bit data are outputted from the data output means 105 as the liquid crystal display data 109.

The liquid crystal display data 109 is given to the X driving means 200 together with the data shift clock 106 and the horizontal clock 107, while the horizontal clock 107 and the line start clock 108 are given to the Y driving means 114. In this way the liquid crystal data 109 are displayed on the liquid crystal panel 116.

The operation of the X driving means 200 and the Y driving means 114 will be explained below, referring to FIGS. 2 and 3.

As seen in FIG. 3, according to the data shift clock 106, the data shift means 300 indicated in FIG. 2 takes-in 160 sets of the display data, i.e. 640 dots (160×4 dots) of data in one horizontal period after the output of the first horizontal clock 107 for the beginning of the display and outputs them as the shift data 301. These shift data 301 are latched by the one-line latch means 302 in accordance with the horizontal clock 107 to form the one-line data 201 (X-D1 to X-D640). That is, the X driving means 200 outputs the data preceding the line by one line in the liquid crystal display data 109, which are taken at that time in the data shift means 300, as the one-line data 201, from the one-line latch means 302 to the liquid crystal 116. The one-line data 201 are displayed on the liquid crystal panel 116 for the lines, which are at "high (H)" in the display line data 115 (refer to (f) and (g) in FIG. 3), which are the output of the Y driving means 114.

The Y driving means 114 makes the first line Y-D1 of the liquid crystal panel 116 "high (H)" by taking-in the line start clock 108 in accordance with the horizontal clock 107 and shifts the line, which is "high (H)", in the order of the second line Y-D2, the third line Y-D3, and so forth, every time a horizontal clock 107 is inputted. Consequently, as seen in FIG. 3, when the X driving means 200 outputs the one-line data 201 of the first line, the Y driving means 114 makes Y-D1 in the display line data 115 "high (H)" and when the X driving means 200 outputs the one-line data 201 of the second line, the Y driving means 114 makes Y-D2 in the display line data "high (H)". When the line liquid crystal display data 201 for each of the pixels are "high (H)", the operation of display-on is executed and when they are "low (L)", the operation of display-off is executed. In this way the display data are displayed on the liquid crystal display panel 116 in the form of letters, figures, etc.

By the prior art technique described above, display data were digital signals and the black and white display, by which the display was either turned on or off, was determined by the level of the signals, either "high (H)" or "low (L)". Thus no multi-colored (multi tone) display of at least 9 colors using analogue signals as the display data was taken into account.

SUMMARY OF THE INVENTION

The main object of the present invention is to display multiple colors of not less than nine colors (multi tone) by using an analogue input.

Another object of the present invention is to take-in liquid crystal display data with a high speed to display them.

Still another object of the present invention is to cause the brightness level of each of the colors to vary arbitrarily by varying the voltage level.

In order to achieve the above objects, a liquid crystal display device according to the present invention is composed of serial/parallel converting means (S/P means) having a high sampling speed, at which the liquid crystal display data are taken-in, with a function of converting serial image data thus taken-in into parallel image data, and X axis direction driving means having a low sampling speed, at which the liquid crystal display data for one pixel are taken-in, with a function of outputting the liquid crystal display data for one line in the horizontal direction, synchronized with the display line signal of the Y axis direction driving means, after having taken-in them, which two means are disposed separately.

Further the S/P means and the X driving means described above are constructed so as to hold analogue quantities in order to output the liquid crystal display data applied to the liquid crystal driving elements constituting the pixels of the liquid crystal display panel in the form of analogue signals.

The S/P means samples serial analogue image data transferred with a high speed from several MHz to several tens of MHz to convert them into parallel analogue data. The transfer speed of the parallel analogue data at this time is a speed at which the X driving means can sample the data satisfactorily. The X driving means samples the parallel analogue data converted by the S/P means described above and outputs the liquid crystal display data for one line to the liquid crystal display panel, synchronized with the display line signal of the Y driving means, after having taken-in the data for one line. At this time, a voltage corresponding to the voltage of the parallel analogue data inputted in the X driving means is given to the liquid crystal panel, and thus the display is obtained on the liquid crystal at a brightness corresponding to that value. In this way the multi-colored multi tone display is made possible.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Hereinbelow an embodiment of the present invention will be explained, referring to FIGS. 5 to 10.

Figure 5:
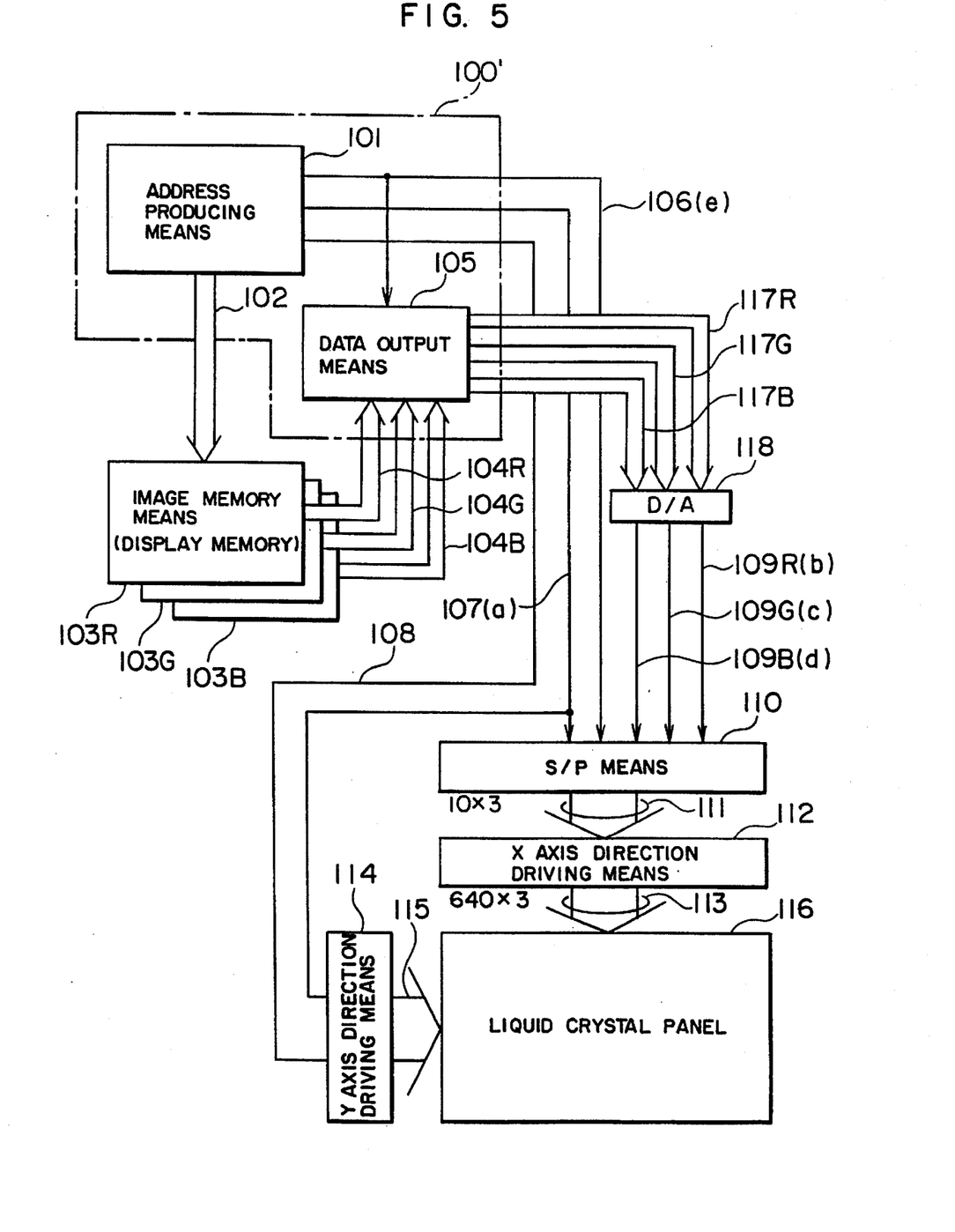
FIG. 5 is a block diagram showing an embodiment of the liquid crystal display device according to the present invention.

FIG. 5 is a block diagram indicating an embodiment of the present invention, in which 100' is a color liquid crystal controller; 101 is an address producing means; 102 is a memory address output; 103R is R memory means storing the R component of the color image data as data (hereinbelow called also an R display memory); 103G is G memory means storing the G component of the color image data as data (hereinbelow called also a G display memory); 103B is B memory means storing the B component of the color image data as data (hereinbelow called also a B display memory); and 104R, 104G and 104B represent R display data, G display data and B display data read out from the R display memory 103R, the G display memory 103G and the B display memory 103B, respectively, by the respective memory addresses 102.

The data output means 105, in which the R display data 104R, the G display data 104G and the B display data 104B are inputted, outputs them, responding to the data shift clock 106, as the R liquid crystal display data 117R, the G liquid crystal display data 117G and the B liquid crystal display data 117B.

The R liquid crystal display data 117R, the G liquid crystal display data 117G and the B liquid crystal display data 117B are digital display data having a plurality of bit widths for each of the colors, in order to be able to express differences in the brightness for each of the colors by differences in the voltage level. 118 is a D/A converter, which converts digital display data into analogue display data. 109R, 109G and 109B are respectively analogue R liquid crystal display data, analogue G liquid crystal display data and analogue B liquid crystal display data. Hereinbelow description will be made, supposing that the frequency of the data shift clock 106 is 20 MHz.

110 is S/P means, which takes-in the analogue R liquid crystal display data 109R, the analogue G liquid crystal display data 109G and the analogue B liquid crystal display data 109B to convert them into analogue parallel liquid crystal display data. 112 is the X axis direction driving means, in which the analogue parallel liquid crystal display data 111 of 10×3 bits converted by the S/P means 110 are inputted and which takes-in the display data for one line to display the image data on the liquid crystal panel 116. Here the speed of the X axis direction driving means 112, with which the liquid crystal display data for one pixel are sampled, is 2 MHz.

As described previously, since the frequency of the data shift clock 106 is 20 MHz and the sampling speed of the X axis direction driving means 112 is 2 MHz, the transfer speed of the data outputted by the S/P means 110 described above should be lower than 2 MHz. Consequently the data width outputted by the S/P means 110 is greater than;

20 (MHz)÷2 (MHz)=10 (bit width).

In the embodiment of the present invention the data width is supposed to be 10 bits for the purpose of explanation. 113 represents one-line liquid crystal data outputted by the X axis direction driving means 112.

Figure 6:
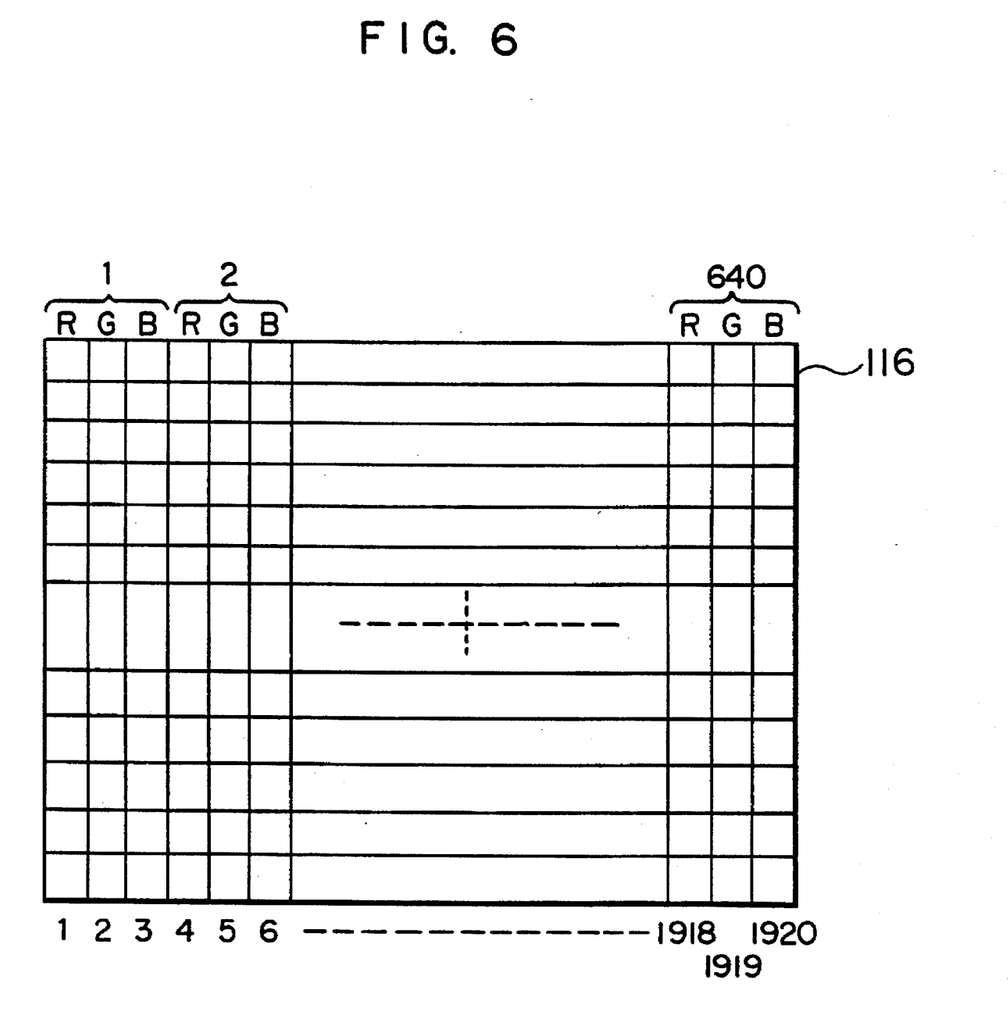
FIG. 6 is a diagram showing the construction of pixels in the liquid crystal panel indicated in FIG. 5.

FIG. 6 illustrates the pixel construction of the liquid crystal panel 116 indicated in FIG. 5. Since each of the lines is constituted by R, G and B in this order from the left end, the X axis direction driving means 112 produces the one-line liquid crystal data 113 according to this pixel format.

Figure 7:
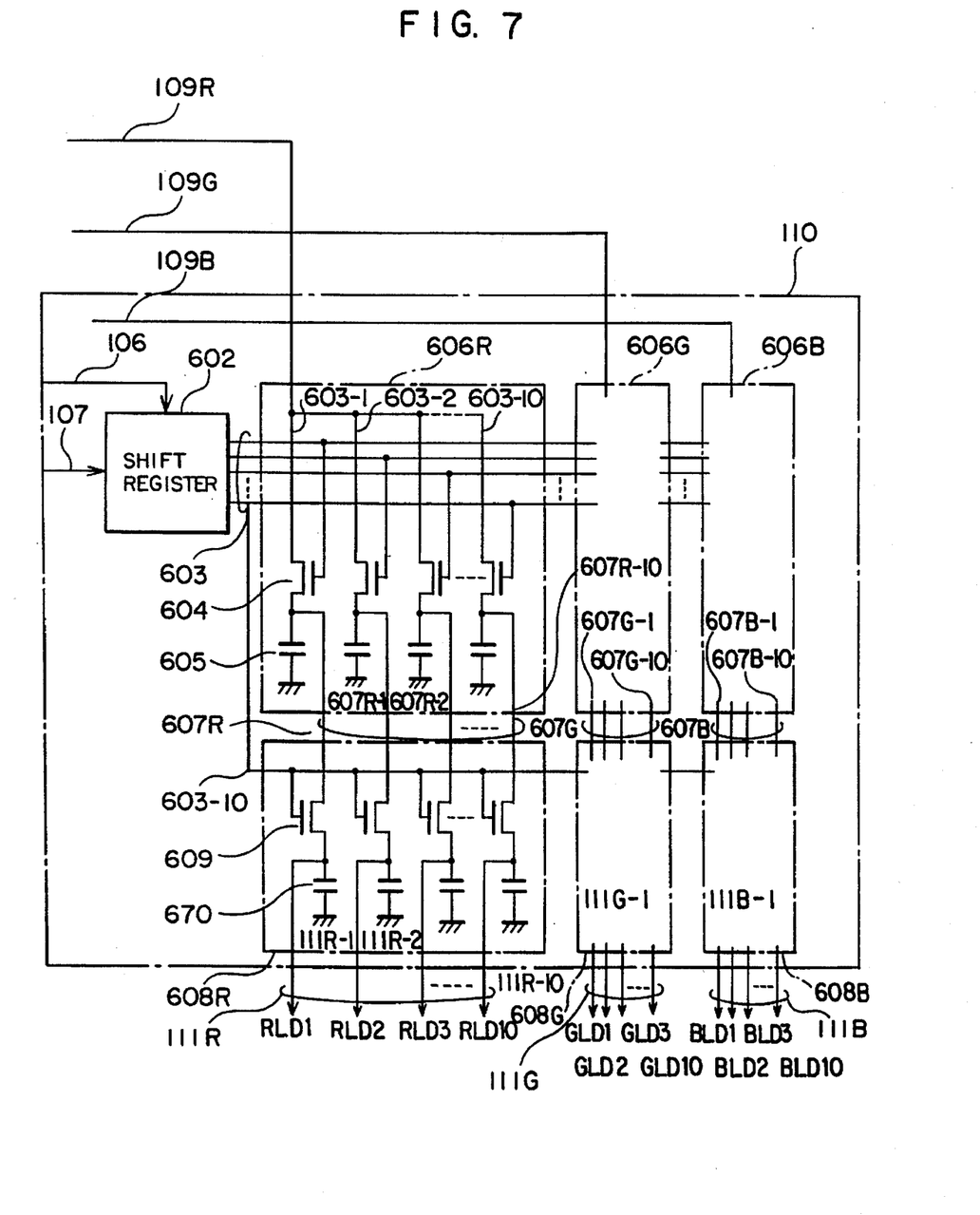
FIG. 7 is a detailed block diagram of the S/P means indicated in FIG. 5.

FIG. 7 is a detailed block diagram showing the construction of the S/P means 110 indicated in FIG. 5.

In FIG. 7, 602 is a shift register, into which the data shift clock 106 and the horizontal clock 107 are inputted and which produces sample blocks of the sampling circuit, i.e. latch clocks, 603, corresponding to R, G and B pixels 606R, 606G and 606B, respectively. The number of the produced latch clocks 603 is the number of sample data of the R pixel sampling circuit 606R, the G pixel sampling circuit 606G and the B pixel sampling circuit 606B, i.e. 10. In either one of the analogue R liquid crystal display data 109R, the analogue G liquid crystal display data 109G and the analogue B liquid crystal display data 109B, when the first image data set is valid, the latch clock 603-1 becomes valid, which latches the image data, and when the second image data set is valid, the latch clock 603-2 becomes valid, which latches the image data. Thereafter, one after another, when the 10-th image data set is valid, the latch clock 603-10 becomes valid, which latches the image data, and when the 11-th image data set is valid, the latch clock 603-1 becomes again valid, which latches the image data. The latch clock 603 repeats this operation. 604 is a transistor which executes a switching operation. 605 is a capacitor which stores the analogue value of the inputted image data. Each of the R pixel sampling circuit 606R, the G pixel sampling circuit 606G and the B pixel sampling circuit 606B has the number of sample data sets, i.e. 10, of transistors 604 and capacitors 605. 607R, 607G and 607B are sample data of the pixel sampling circuits 606R, 606G and 606B, respectively. 608R, 608G and 608B are latch circuits, whose input data are the sample data 607R, 607G and 607B of the pixel sampling circuits 606R, 606G and 606B, respectively, and which latch them by the latch clock 603-10. Each of the pixel latch circuit 608R, 608G and 608B has 10 transistors 609 and 10 capacitors 610. The transistors 609 carry out the switching operation and the capacitor 610 carry out the data holding operation. 111R, 111G and 111B are analogue parallel liquid crystal display data, which are the output data of the pixel latch circuit 608R, 608G and 608B.

Figure 8:
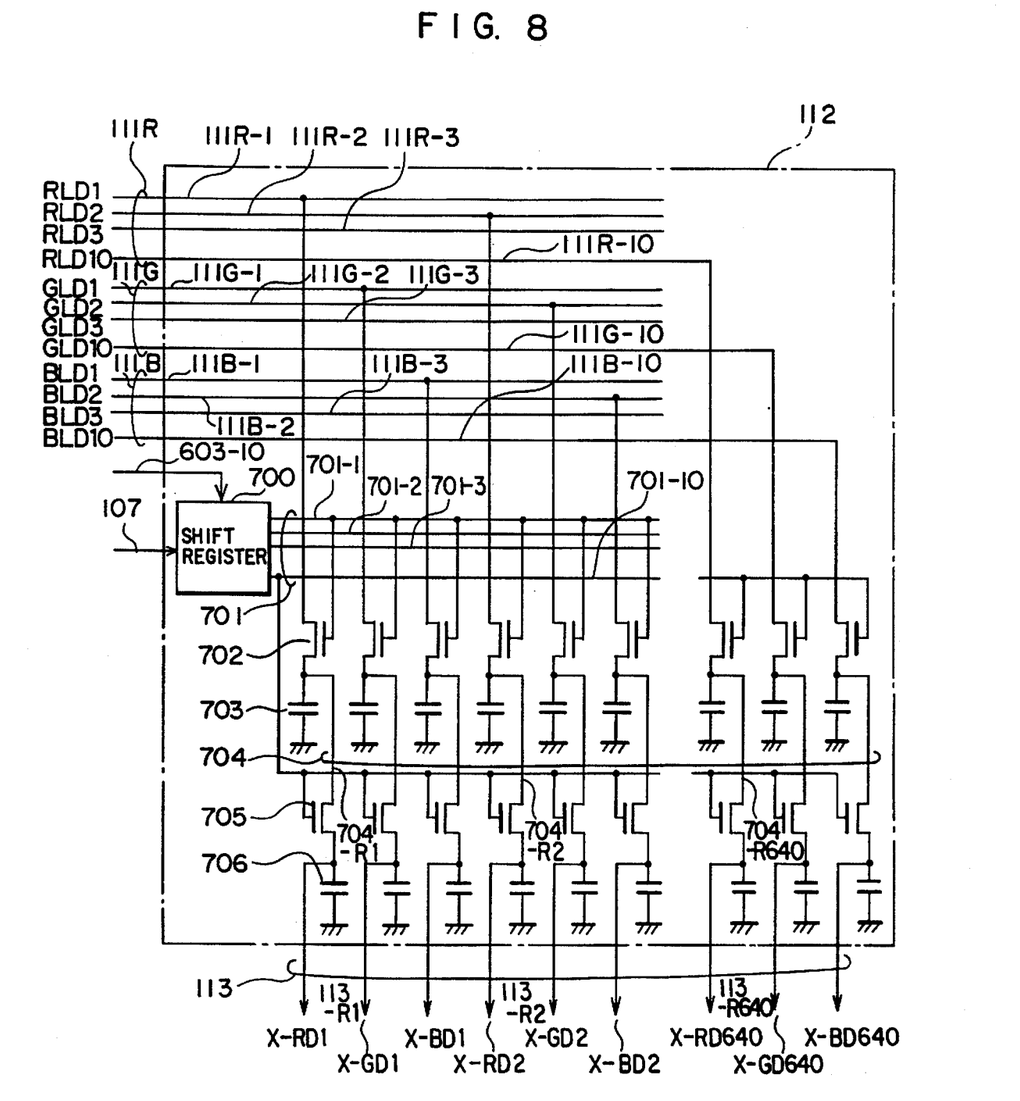
FIG. 8 is a detailed block diagram of the X axis direction driving means indicated in FIG. 5.

FIG. 8 is a detailed block diagram of the X axis direction driving means 112.

In FIG. 8, 700 is a shift register, in which the latch clock 603-10 and the horizontal clock 107 are inputted, and which produces the latch clock 701 for the one-line liquid crystal data 113. 702 is a transistor and 703 is a capacitor. The analogue parallel liquid crystal display data 111, which are the output data of the S/P means 110 in FIG. 7, are converted into the one-line sampling liquid crystal display data, and outputted as the one-line liquid crystal display data 113. 705 is a transistor and 706 is a capacitor.

Figure 9:
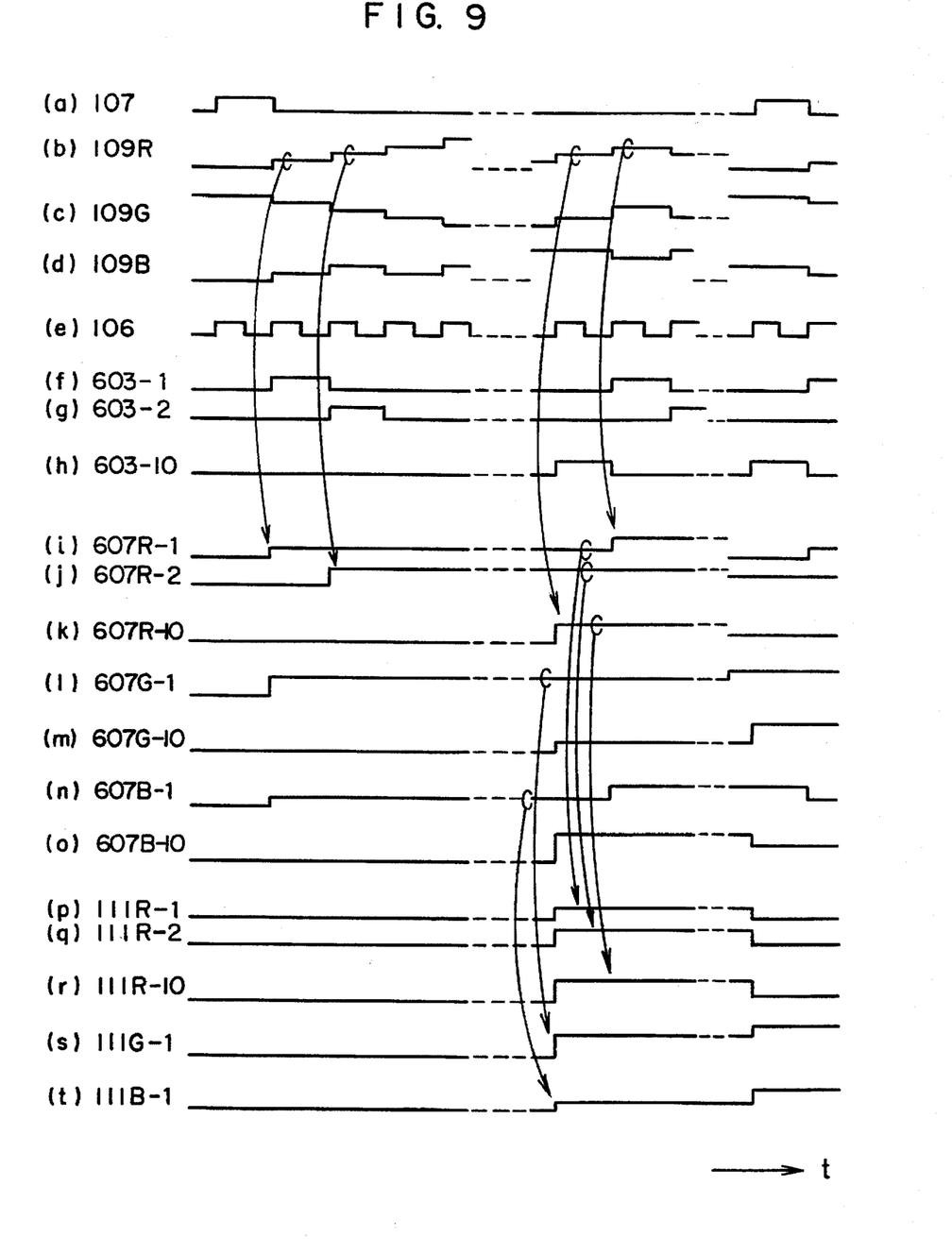
FIG. 9 is an operation timing chart of the S/P means indicated in FIGS. 5 and 7.

FIG. 9 is a timing chart of various signals relating to the operation of the S/P means in FIGS. 5 and 7.

In FIG. 9, (a) indicates the horizontal clock 107, which is a clock produced for every horizontal scanning period for the display image, synchornized therewith. (b) indicates the analogue R liquid crystal display data 109R; (c) the analogue G liquid crystal display data 109G; and (d) the analogue B liquid crystal display data 109B. (e) indicates the data shift clock 106, which is valid during a period where one-pixel data are valid, i.e. which produces a latch clock 603-1 indicated in (f), a latch clock 603-2 indicated in (g) and a latch clock 603-3 indicated in (h) having a one-data shift clock width. The latch clock 603 latches the analogue liquid crystal display data 109R, 109G and 109B to hold the sample data 607R-1 indicated in (i), the sample data 607R-2 indicated in (j) and the sample data 607R-10 indicated in (k). It would be understood that the sample data 607R-1 indicated in (i), the sample data 607R-2 indicated in (j) and the sample data 607R-10 indicated in (k) are shifted in synchronism with the latch clock 106 to be stored and held. (p), (q) and (r) represent the analogue parallel liquid crystal display data 111R-1, 111R-2 and 111R-10, which are signals obtained by latching the sample data 607R-1 indicated in (i), the sample data 607R-2 indicated in (j) and the sample data 607R-10 indicated in (k) by the latch clock 603-10 indicated in (h) in synchronism therewith.

Figure 10:
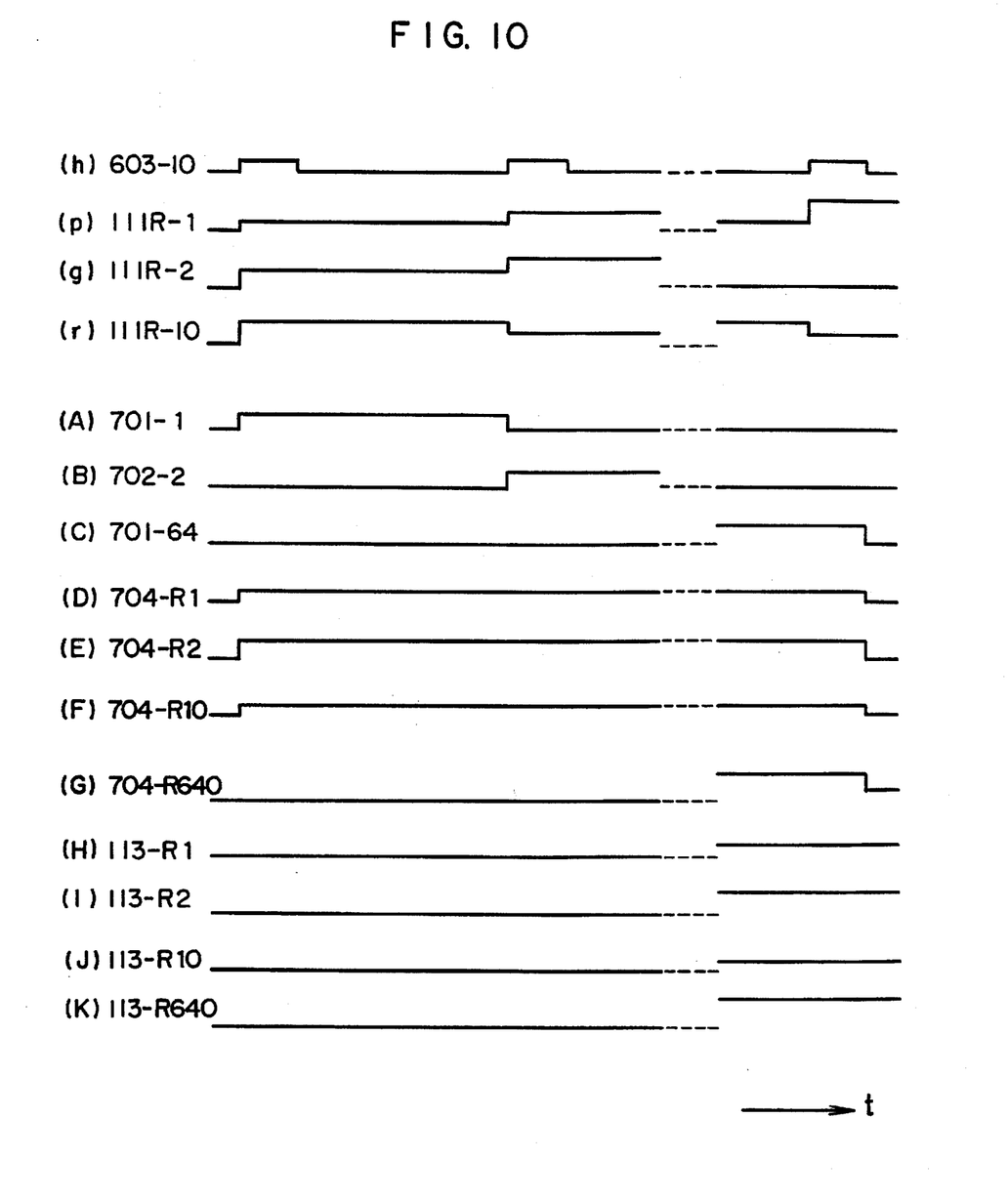
FIG. 10 is an operation timing chart of the X axis direction driving means indicated in FIGS. 5 and 8.

FIG. 10 is a timing chart of various signals relating to the operation of the X axis direction driving means 112 in FIGS. 5 and 8.

In FIG. 10, (h) represents the latch clock 603-10, which is a clock produced by the shift register 602 indicated in FIG. 7. (A), (B) and (C) represent the latch clock 701-1, the latch clock 701-2 and the latch clock 701-64, respectively. It would be understood that they are produced for every period of the latch clock 603-10 indicated in (h) in synchronism therewith and shifted. These latch clocks 701-1, 701-2 and 701-64 latch the analogue parallel liquid crystal display data 111R-1, 111R-2 and 111R-10 to obtain the one-line sampling liquid crystal display data 704 indicated in (E), (F) and (G), respectively. They are further latched by the latch clock 701-64 to be the one-line liquid crystal display data 113. Although, in FIGS. 9 and 10, the timing of the sample data is indicated for the R pixel sample data 607R and that of the analogue parallel liquid crystal display data 111 is indicated only for the R pixel analogue parallel liquid crystal display data 111R, it is a matter of course that the operation for the other G and B pixels is identical thereto.

Now, in order to explain the operation, FIG. 5 is referred to again.

In FIG. 5, pixel information stored in the R display memory 103R, the G display memory 103G and the B display memory 103B are read out according to the memory address 102 produced by the address producing means 101 to provide the R display data 104R, the G display data 104G and the B display data 104B, respectively. These R display data 104R, G display data 104G and B display data 104B are inputted to the data output means 105, subjected to data conversion in accordance with the interface on the liquid crystal panel side to form the R liquid crystal display data 117R, the G liquid crystal display data 117G and the B liquid crystal display data 117B according to the data shift clock 106, and outputted from the data output means 105.

The R liquid crystal display data 117R, the G liquid crystal display data 117G and the B liquid crystal display data 117B, which are digital signals, are converted into the analogue R liquid crystal display data 109R, the analogue G liquid crystal display data 109G and the analogue liquid crystal display data 109B, which are analogue signals, by the D/A converter 118.

The difference in the brightness in each of the colors indicated in FIG. 6 is determined by the voltage of the analogue R liquid crystal display data 109R, the analogue G liquid crystal display data 109G and the analogue B liquid crystal display data 109B.

The analogue R liquid crystal display data 109R, the analogue G liquid crystal display data 109G and the analogue B liquid crystal display data 109B are inputted to the S/P means 110 together with the data shift clock 106 and the horizontal clock 107, and the horizontal clock 107 and the line start clock 108 are inputted to the Y axis direction driving means 114. In the S/P means 110, the analogue R liquid crystal display data 109R, the analogue G liquid crystal display data 109G and the anlogue B liquid crystal display data 109B inputted therein are converted into the analogue parallel R liquid crystal display data 111R, the analogue parallel G liquid crystal display data 111G and the analogue parallel B liquid crystal display data 111B, respectively, which are inputted in the X axis direction driving means 112 to be converted into the one-line liquid crystal data 113. Then they are displayed as letters or figures on the liquid crystal panel 116.

Hereinbelow the operation of the S/P means 110 used for implementing the present invention will be explained, referring to FIGS. 7 and 9.

In FIG. 7, the analogue R liquid crystal display data 109R, the analogue G liquid crystal display data 109G and the analogue B liquid crystal display data 109B are inputted in the R pixel sampling circuit 606R, the G pixel sampling circuit 606G and the B pixel sampling circuit 606G, respectively, and sampled by 10 latch clocks 603. The timing showing the aspect of this sampling is shown in FIG. 9. The latch clocks 603-1, 603-2 and 603-10 indicated in (f), (g) and (h) sample the inputted analogue liquid crystal display data 109R, 109G and 109B to obtain the sample data 607R-1, 607R-2 and 607R-10 indicated in (i), (j) and (k), respectively. Although here only the R pixel data are explained for the sample data, the same is true also for the G and B pixel data. The latch clocks 603-1, 603-2 and 603-10 are produced, when the data shift clock 106 and the horizontal clock 107 are inputted in the shift register 602 indicated in FIG. 7 and the operation thereof will be explained. In FIG. 9, in all the pixel data of the analogue R liquid crystal display data 109R indicated in (b), the analogue G liquid crystal display data 109G indicated in (c) and the analogue B liquid crystal display data 109B, when the first pixel data set is valid after the display of one horizontal line has been started, the latch clock 603-1 becomes valid for the period, where the pixel data are valid, i.e. for the one-data shift clock width, and latches the first pixel data set. Next, when the second pixel data set is valid, the latch clock 603-2 becomes valid and latches the second pixel data set. Thereafter the same operation is repeated one after another and when the tenth pixel data set is valid, the latch clock 603-10 becomes valid and latches the tenth pixel data set. When the eleventh pixel data set is valid, the latch clock becomes valid again and latches the eleventh pixel data set. The latch clock 603 repeats this operation. In order to effect the data arrangement to obtain the parallel data before the sample data 603-1, 603-2 and 603-10 shifted and held here are updated, the latch circuits 608R, 608G and 608B for each of the pixels indicated in FIG. 7 are used. The timing showing the aspect of this operation is indicated in FIG. 9. It can be seen therefrom that before the sample data 607R-1 indicated in (i), the sample data 607R-2 indicated in (j) and the sample data 607R-10 indicated in (k) shifted and held are updated, the latch clock 603-10 indicated in (h) latches them and effects the data arrangement to convert them into parallel data to obtain 111R-1 indicated in (p), 111R-2 indicated in (q) and 111R-10 indicated in (r), which are analogue liquid crystal parallel data. The parallel data 111R, 111G and 111B of 10 bits per pixel are inputted in the X axis direction driving means 112 indicated in FIGS. 5 and 8 to be converted into the one-line liquid crystal data 113.

Next the operation of the X axis direction driving means 112 will be explained, referring to FIGS. 8 and 10.

In FIG. 8, the analogue parallel R liquid crystal display data 111R, the analogue parallel G liquid crystal display data 111G and the analogue parallel B crystal display data 111B of 10 bits per pixel are subjected to the switching operation by the latch clock 701 by using 640×3 transistors 702 and stored in 640×3 capacitors 703 in the form of analogue data values. The data thus stored are outputted as the one-line sampling liquid crystal display data 704 of 640×3 bits. The timing showing the aspect of this latching operation is indicated in FIG. 10. Here the operation of the latch clocks 701 indicated in (A), (B) and (C) will be explained. All the latch clocks 701-1, 701-2 and 701-64 are produced, when the latch clock 603-10 and the horizontal clock 107 are inputted into the shift register 700. Again in FIG. 10, it can be seen that the latch clocks 701-1, 701-2 and 701-64 become valid one after another for every period of the latch clock 603-10. The period where the latch clock 701-1 is valid is a period where the first 10-bit parallel data set is valid in the inputted analogue parallel liquid crystal display data 111R-1, 111R-2 and 111R-10 for each of the pixels. Further the period where the latch clock 701-2 is valid is a period where the second 10-bit parallel data set is valid in the inputted analogue parallel liquid crystal display data 111R-1, 111R-2 and 111R-10 for each of the pixels. Thereafter this operation is repeated successively and when the 64-th 10-bit parallel data set, i.e. the last in one horizontal display line, is valid, the latch clock 701-64 is valid. Further, when the data of the succeeding one horizontal display line are inputted, as indicated above, the latch clocks 701-1, 701-2 and 701-64 repeat the operation. Further, in order that, before the sampling data 704-R1, 704-R2 and 704-R3 are updated to the succeeding one-line data, the data arrangement is effected to obtain the data of 630×3 pixels, the transistor 705 and the capacitor 706 disposed for each of the pixels indicated in FIG. 8 are used. The timing indicating this operation is shown in FIG. 10. It can be seen how the latch clock 701-64 indicated in (C) as well as the sampling data 704-R1 indicated in (D), the sampling data 704-R2 indicated in (E) and the sampling data 704-R640 indicated in (G) shifted and held are latched before they are updated and the data arrangement is effected to convert them into the one-line liquid crystal data (H) 113-R1, (I) 113-R2 and (K) 113-R640. Further, although the explanation of the operation indicated in FIGS. 8 and 10 has been made only for the R pixels for the purpose of simplifying the explanation, the same operation is effected for the G and B pixels. These one-line liquid crystal display data 113 are outputted to the liquid crystal panel 116 indicated in FIG. 5 to display them in the form of letters or figures.

According to the present invention, since the S/P means is disposed for the prior art X axis direction driving means, an effect can be obtained that even liquid crystal display data, whose speed will be increased more and more in the future, can be easily inputted to be displayed.

Further, since the X axis direction driving means is not replaced by the S/P means, but by S/P means and X axis direction driving means disposed separately, an increase in the cost can be suppressed.

Still further, owing to the fact that the S/P means and the X axis direction driving means and analogue control means, since it is not necessary to dispose any brightness gradation control means on the liquid crystal controller side, an effect is obtained that the liquid crystal display device can be simplified.

In addition, a remarkable effect is obtained that the brightness level for each of the colors can be varied arbitrarily by varying the voltage level.

We claim:

1. An information processor for displaying images, said information processor comprising:
   (a) a display data memory circuit for storing display information for over one display image as digital data;
   (b) a readout circuit for successively reading out digital display image data from said display data memory circuit and for producing a timing signal synchronized with the read display data;
   (c) an analog display data producing circuit, including a converting circuit for successively converting the read out digital display image data to analog display data and outputting said analog display data;
   (d) an analog display data driving circuit including,
      a first holding circuit for successively receiving and holding the analog display data,
      a first output circuit for outputting the analog display data held by said first holding circuit,
      a second holding circuit for successively receiving and holding the analog display data outputted by said first output circuit, and
      a second output circuit for outputting the analog display data held by said second holding circuit;
   (e) a Y axis direction driving circuit for outputting a selection voltage to successively select horizontal display lines in accordance with the timing signal produced by said readout circuit; and
   (f) a liquid crystal panel including an X axis direction driving electrode for transmitting the analog display data outputted by said analog display data driving circuit, a Y axis direction driving electrode for transmitting the selection voltage outputted by said Y axis direction driving circuit, a pixel part constituted by switching elements, pixel electrodes and liquid crystal at a location at which the X axis direction driving electrode is crossed by the Y axis direction driving electrode in a matrix state.

2. An information processor according to claim 1, wherein:
   said display data memory circuit includes capacity for storing display data having red, blue, and green color information for over one display image;
   said analog display data producing circuit includes circuitry for successively converting the digital display data having the red, blue and green color information to analog display data and outputting the analog display data to data lines for red data, blue data and green data;
   said first holding circuit includes circuitry for receiving the analog display data having the color information from the data lines for red data, blue data and green data, and for holding the analog display data;
   said first output circuit includes circuitry for outputting the analog display data to a plurality of data lines for red data, a plurality of data lines for blue data and a plurality of data lines for green data;
   said second holding circuit includes circuitry for receiving the analog display data from the plurality of data lines for red data, the plurality of data lines for blue data and the plurality of data lines for green data;
   said second output circuit includes circuitry for outputting the analog display data to the plurality of data lines for red data, the plurality of data lines for blue data and the plurality of data lines for green data, and
   said information processor further includes red, blue and green color filters for every pixel in the horizontal direction on said liquid crystal panel, wherein color filters of the same color are provided at each pixel corresponding to the driving electrode wired in the vertical direction of said liquid crystal panel, and said plurality of data lines for red data, blue data and green data for outputting the analog display data from said second output circuit are connected with the X axis direction driving electrode corresponding to pixel parts having the corresponding color filter provided at said liquid crystal panel to output color display data corresponding to each pixel part of said liquid crystal panel.

3. An information processor according to claim 2, wherein:
   said second output circuit includes circuitry for outputs the display data corresponding to each pixel part on a line when the line is selected by said Y axis direction driving circuit, and said first holding circuit, said first output circuit and said second holding circuit process the display data corresponding to each pixel part of the next line of said line.

4. An information processor according to claim 1, wherein:
   said display data readout circuit includes circuitry for producing as the timing signal a synchronizing signal synchronized with the analog display data, a horizontal synchronizing signal produced when said analog display data is transmitted for one horizontal period, and a vertical synchronizing signal produced when said analog display data for one display image is transmitted, and said second output circuit includes circuitry for outputting the display data corresponding to each pixel part on a line when the line is selected by said Y axis direction driving circuit, and said first holding circuit, said first output circuit and said second holding circuit process the display data corresponding to each pixel part of the next line of said line.

5. A color liquid crystal display device comprising:
   (a) an analog display data driving circuit including:
      a first holding circuit for successively receiving and holding analog display data including color information from a data line for red data, a data line for blue data, and a data line for green data,
      a first output circuit for successively receiving the analog display data held by said first holding circuit, and successively outputting the analog display data from a plurality of data lines for red data, a plurality of data lines for blue data, and a plurality of data lines for green data,
      a second holding circuit for receiving the analog display data outputted by said first output circuit from said plurality of data lines for red data, said plurality of data lines for blue data, and said plurality of data lines for green data, and
      a second output circuit for simultaneously outputting the analog display data for one horizontal line held by said second holding circuit by using said plurality of data lines for red data, said plurality of data lines for blue data, and said plurality of data lines for green data;
   (b) a Y axis direction driving circuit for outputting a selection voltage to successively select a horizontal line;
   (c) a liquid crystal panel including an X axis direction driving electrode for transmitting the analog display data outputted by said analog display data driving circuit, a Y axis direction driving electrode for transmitting the selection voltage outputted by said Y axis direction driving circuit, a pixel part constituted by switching elements, pixel electrodes and liquid crystal at a location at which the X axis direction driving electrode is crossed by the Y axis direction driving electrode in a matrix state; and
   (d) red, blue and green color filters for every pixel in the horizontal direction on said liquid crystal panel, wherein color filters of the same color are provided at each pixel corresponding to the driving electrode wired in the vertical direction of said liquid crystal panel, and said plurality of data lines for red data, blue data and green data for outputting the analog display data from said second output circuit are connected with the X axis direction driving electrode corresponding to pixel parts having the corresponding color filter provided at said liquid crystal panel to output color display data corresponding to each pixel part of said liquid crystal panel.

6. A color liquid crystal display device according to claim 5, wherein:

said second output circuit includes circuitry for outputting the display data corresponding to each pixel part on a line when the line is selected by said Y axis direction driving circuit, and said first holding circuit, said first output circuit and said second holding circuit process the display data corresponding to each pixel part of the next line of said line.

* * * * *